(No Model.)  3 Sheets—Sheet 1.
F. S. GIEL.
AUTOMATIC REGULATOR FOR DYNAMO ELECTRIC MACHINES.
No. 282,187. Patented July 31, 1883.
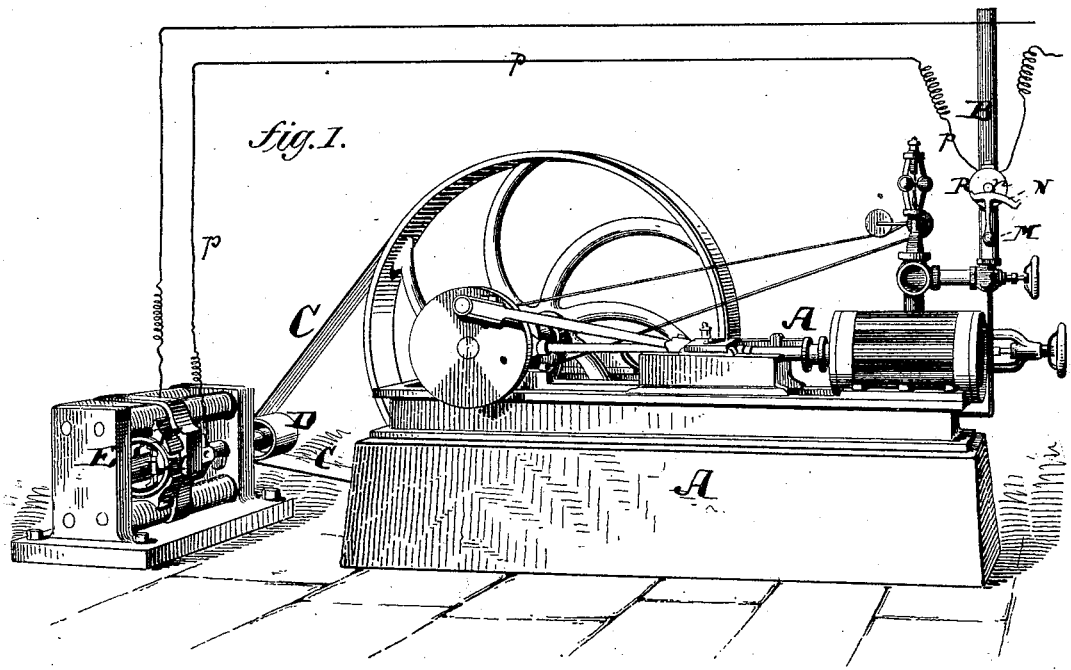
WITNESSES:
INVENTOR
Franz S. Giel
BY Briesen & Betts
his ATTORNEYS.

(No Model.) 3 Sheets—Sheet 2.
F. S. GIEL.
AUTOMATIC REGULATOR FOR DYNAMO ELECTRIC MACHINES.
No. 282,187. Patented July 31, 1883.
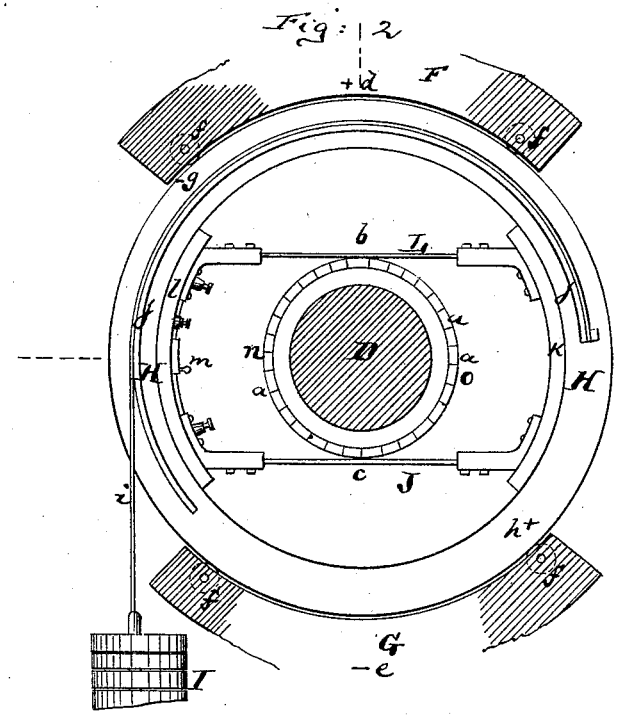
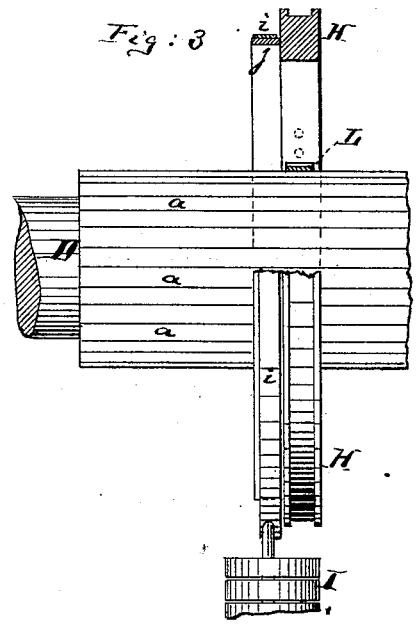
Witnesses:
John C. Tunbridge
Edward ...
Inventor:
Franz S. Giel
by his attorneys
Briesen & Betts (No Model.) 3 Sheets—Sheet 3.

F. S. GIEL.
AUTOMATIC REGULATOR FOR DYNAMO ELECTRIC MACHINES.

No. 282,187. Patented July 31, 1883.

WITNESSES:
Gustave Dieterich
John C. Tunbridge

INVENTOR
Franz S. Giel
BY Briesen & Betts,
his ATTORNEYS

N. PETERS, Photo-Lithographer, Washington, D. C.

UNITED STATES PATENT OFFICE.

FRANZ S. GIEL, OF BROOKLYN, ASSIGNOR OF ONE-HALF TO JOSEPH LEDERLE, OF TOMPKINSVILLE, NEW YORK.

AUTOMATIC REGULATOR FOR DYNAMO-ELECTRIC MACHINES.

SPECIFICATION forming part of Letters Patent No. 282,187, dated July 31, 1883.

Application filed October 5, 1882. (No model.)

*To all whom it may concern:*

Be it known that I, FRANZ S. GIEL, of Brooklyn, in the county of Kings and State of New York, have invented a new and Improved Automatic Regulator for Electric Machinery, of which the following is a specification.

Figure 4:
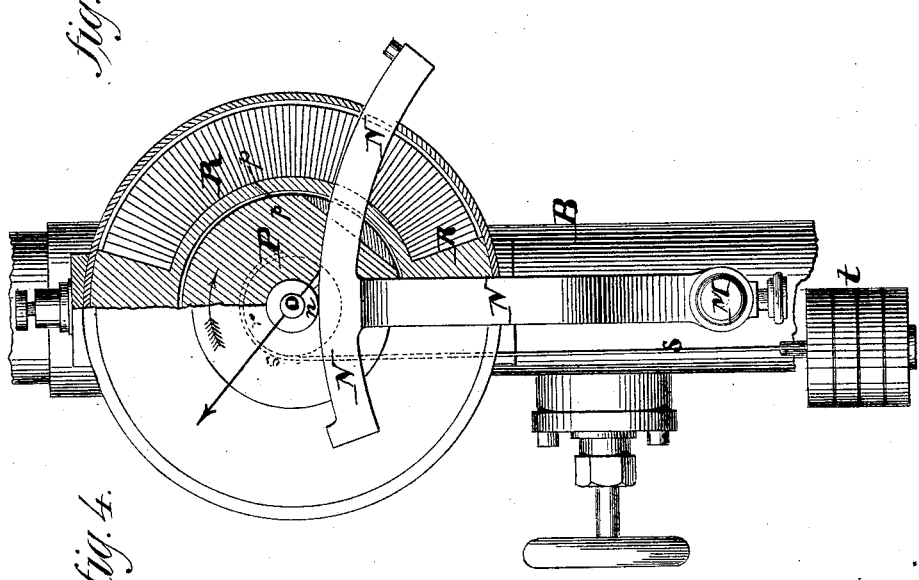

Figure 1 is a perspective view of a steam-engine and its connections with a dynamo-machine, indicating my improvements. Fig. 2 is a vertical cross-section of the current-regulator; Fig. 3, a side view, partly in section, thereof; Fig. 4, a face view, partly in cross-section, of the valve-regulator; and Fig. 5, a side view of the same.

This invention relates to improvements in electric machines used for producing lights, or for any other purpose, and has for its object to automatically equalize the slight variations that would otherwise be produced by the unevenness of current in electric machines, and thus to equalize to a nicety the resulting labor of the machine. Thus, if the machine is employed for producing light, the lights will be maintained with absolute steadiness by the means of the regulator which I apply to the commutator of the machine.

To these ends my invention consists in combining with the commutator or analogous instrument a rotating balanced magnetized ring carrying lamellæ that are in contact with the periphery of the commutator, and that are united with one another metallically, and serve, when the current exceeds its normal strength, to take off the excess.

In the accompanying drawings, with reference to Fig. 1, the letter A represents a suitable steam-engine, supplied by the pipe B with steam from a suitable boiler, and having all the usual appliances of a steam-engine, including governor, fly-wheel, &c. This steam-engine, by means of a belt, C, drives the shaft D of a dynamo-electric machine, E.

In Figs. 2 and 3 is shown the regulator for equalizing slight variations of current in the machine E. In these figures, the letter D represents the shaft, which is rotated by the belt C directly or indirectly, and which carries the isolated segments $a$ $a$ of a commutator, which, on a line at right angles with the line of the vertical axis $b$ $c$, Fig. 2, is touched by the commutator-brushes, that are not shown in the drawings, and are well known to all skilled in the making or operating of electrical contrivances. The field-magnets F and G of the dynamo-machine are indicated in Fig. 2, and are so arranged that the poles $d$ $e$ of these magnets are in a vertical plane, while the poles of the commutator are at right angles with the line $b$ $c$. In the example shown the pole $d$ may be assumed to be the positive pole and the pole $e$ the negative pole of the machine, although that arrangement may be reversed. Between the field-magnets F and G is interposed a ring, H, of soft iron or magnetized steel, and this ring is capable of ready rotation between the field-magnets, preferably by means of friction-wheels $f$, that are interposed as shown. The said ring is so magnetized and so balanced by a weight, I, that during the action of the machine, when the same is under the influence of the normal current, the negative pole of the ring will be about forty-five degrees away from the positive pole of the field-magnet and the positive pole of the ring similarly distant from the negative pole of the field-magnet. Thus if $d$ is the positive pole of the magnet F, $g$ will be the negative pole of the ring H and $h$ the positive pole of said ring. It follows, as a matter of course, that when the power of the current that traverses the machine E is increased ever so little the ring H will at once be turned to bring its pole $g$ nearer to $d$, and when the normal current has been restored the ring will, by the weight I, be brought back to the position shown in Fig. 2. The weight I is shown to be suspended from a strap, $i$, which connects with a rim, $j$, that is fixed to the ring H. The ring H has on its inner side, or, if desired, on its face, non-conducting blocks $k$ and $l$, of rubber or other analogous material, and these blocks carry on each side of the shaft D the lamellæ J and L, which are parallel to one another, and in the normal position of the ring H and of the current of the machine at right angles with the line running from the pole $d$ to the pole $e$, so that they are, in other words, as they touch the commutator on the shaft, tangential normally with the neutral zone of the commutator. By means of a switch, $m$, or, if desired, by a permanent connection, the lamellæ J and L are metallically united with one another. When the switch *m* unites the two lamellæ, J and L, the machine operates as follows: Whenever the current is normal the parts will be in the position shown in Fig. 2, the lamellæ will touch the commutator on the neutral zone, and will exert no influence at all upon the strength of the current. As soon, however, as the current exceeds its normal strength, the pole *g* will be attracted to the corresponding extent by the pole *d*, and the ring H will be turned so as to lift the weight I, thus bringing the lamellæ J and L correspondingly nearer to the poles *n* and *o*, where the excess of current will be taken up by the lamellæ and extinguished, so far as the effect on the machine is concerned. This same matter may also be expressed as follows: As the strength of current increases the excess will be perceptible at the poles *n* and *o*, and will spread from these poles to the neutral zone, and inasmuch as at the same time the lamellæ will be moved away from the neutral zone into contact with those parts of the commutator which conduct this excess of current, the lamellæ, being in themselves metallically united, will become conductors of this excess of current, and will carry it—the one lamellæ positively, the other negatively—to the uniting-point, where the extinction takes place.

Figure 5:
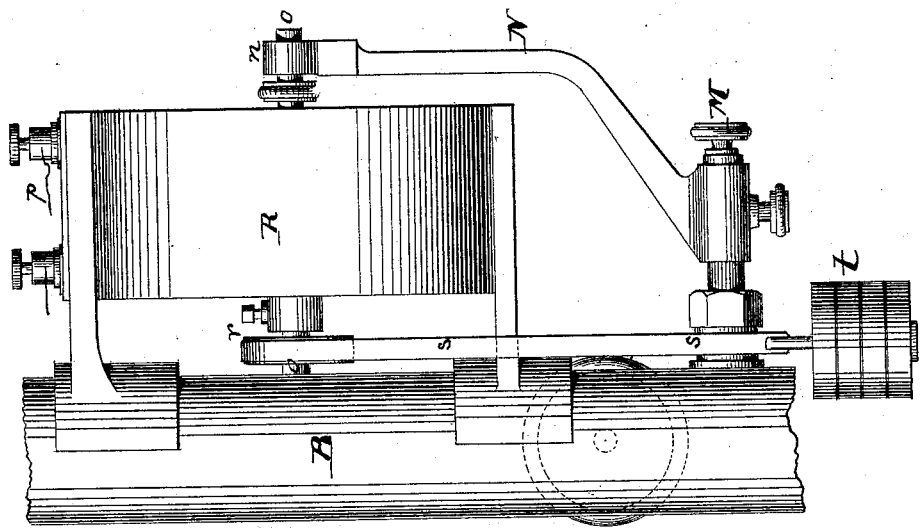

It will be clear that the apparatus so far described is a most sensitive automatic regulating contrivance for preventing slight inequalities in the operation of a dynamo-machine. It is not intended to affect serious disturbances, or to equalize them, but will render the machine reliable and perfectly even in operation, so long as the requisite power is substantially given and slight irregularities take place. When, however, the power which is given out by the dynamo-machine should be suddenly reduced to a considerable extent, an analogous principle is employed by me to equalize the run of the dynamo-machine by the action of its own current. To this end the structure shown in Figs. 4 and 5 is employed. Here the steam-pipe B is shown on a larger scale, and also the spindle of the throttle-valve M, which admits the steam to the engine A. This throttle-valve carries a segment, N, whose periphery is in frictional contact with a roller, *n*, of elastic or other substance, mounted upon a spindle, *o*. Upon this spindle is mounted an iron cylindrical block, P, which is wound with the conducting-wire *p* of the dynamo-machine in such a direction that its positive and negative poles will normally lie at about an angle of forty-five degrees from the vertical. Around the cylindrical block P is placed an annular electro-magnet, R, which is wound by the same conducting-wire, *p*, in such manner that its poles will be on the vertical line, and normally, therefore, at about forty-five degrees from the reversed poles of the block P. Upon the spindle *o*, which hangs in suitable bearings, (see Fig. 5,) is also mounted a disk, *r*, to which is fastened a strap, *s*, carrying a weight, *t*. When the throttle-valve is fully open, the block P will lie in the normal position, for the purposes of this explanation, and its poles will be at about forty-five degrees, as stated, from the reverse poles of the annular electro-magnet R, and the weight *t* will be as far down as practicable. When, if the electric machine is used to light a large district, suddenly a large number of lights are extinguished, and when, therefore, under ordinary circumstances, the dynamo-machine should give out more power than is required of it, the apparatus invented by me will cause that power to be automatically reduced, for the reduction in power given out by the dynamo-machine will cause (the steam-engine working with undiminished power) the current which passes over the electric conductors to become increased in strength, and this increase of current will cause the poles of the annular electro-magnet R to attract those of the block P, and will cause the block P to be revolved in the direction of the arrow which is shown in Fig. 4, and the weight *t* to be raised. This same rotary motion of the block P is imparted to its spindle *o*, and from there to the disk *n* and to the segment N on the throttle-valve, thus moving the latter, and causing it to more or less close the supply of steam to the engine and to insure a decrease in the supply of power given out by the engine which shall be in harmony with the amount of power required from the dynamo-machine. In analogous manner, when suddenly the power required of the dynamo-machine shall be enlarged to an appreciable extent, the throttle-valve will be opened by the decreased attraction existing between the poles of the block P and of the electro-magnet R, when the weight *t* will exert its influence and cause the throttle-valve to be correspondingly opened.

It is quite evident that, in lieu of the weights *t* and I, springs may be employed; also, that the principles of my invention having been explained, it is easy to modify it by turning the outer cylinder, R, instead of the inner cylinder, P, on substantially the same principle as here described. The cylinder P is turned by R simply because it is capable of rotation, and the bulk of magnetic power is greater in R than in P. If this were reversed and R made capable of rotation, whereas P would have the larger bulk of magnetism, the result would be that the outer cylinder would be revolved around the inner.

I also desire it to be understood that for the purpose of this specification, so far as the main feature of invention is concerned, the two field-magnets F and G, which are shown in Fig. 2, are really analogous to the electro-magnet R, which is shown in Fig. 4, and are the effective parts of the outer cylinder. They may be carried around the ring H and caused to meet on the line of the neutral zone, if desired.

I have described the invention that has reference to the regulation of the valve M as applicable to a steam-engine; but it is quite evident that the same invention can be used in connection with any other motor than a steam-engine. Thus, where water-power, a gas-engine, or any other analogous motor is employed, the valve M, which regulates the supply of the actuating agent to the motor, will be the valve which, in accordance with my invention, shall be regulated by the demand which is made upon the dynamo-machine.

I claim—

1. In an electric apparatus, the combination of an outer magnetized cylinder with an inner magnetized and counterbalanced cylinder, the said counterbalanced cylinder being capable of rotation, and having its poles normally at an angle of about forty-five degrees to the reverse poles of the other of said cylinders, substantially as described.

2. In a dynamo-machine, the commutator-shaft D, having the commutator-segments $a$, combined with the balanced ring H, lamellæ J and L, and magnets F and G, for operation substantially as described.

3. The electro-magnets F and G of a dynamo-machine, combined with the friction-rollers $f$, ring H, non-conducting blocks $k$ $l$, lamellæ J L, and inner commutator-shaft, D, having segments $a$, substantially as described.

4. The metallic connection $m$ and lamellæ J L, combined with the non-conducting blocks $k$ and $l$, ring H, and outer magnets, F and G, substantially as and for the purposes set forth.

FRANZ S. GIEL.

Witnesses:
WILLIAM H. C. SMITH,
WILLY G. E. SCHULTZ.